United States Patent Office 2,981,700
Patented Apr. 25, 1961

2,981,700

PREPARATION OF CELLULAR POLYURETHANE RESINS

Earl E. Parker, Allison Park, and Keith H. Coultrap, Pittsburgh, Pa., assignors to Pittsburgh Plate Glass Company, Allegheny County, Pa.

No Drawing. Filed June 21, 1955, Ser. No. 517,094

4 Claims. (Cl. 260—2.5)

This invention relates to the preparation of solid, resinous, polyurethanes and it has particular relation to the preparation of polyurethanes by the reaction of a diisocyanate and a polyester containing available hydroxyls and being the esterification product of a dicarboxylic acid and a plurality of alcohols, one of which is dihydric and another of which contains three or more hydroxyl groups.

Valuable resinous materials have heretofore been provided by reacting a diisocyanate, such as tolylene diisocyanate, or mixtures of isomers of the same, with a polyester of the alkyd type containing available hydroxyl groups. Polyesters suitable for the purpose may, for example, be prepared by reacting a dicarboxylic acid, preferably one which is free of ethylenic groups of the reactive type, with a di- or polyhydric alcohol, or preferably with a mixture of alcohols, one of which is dihydric and another of which is polyhydric.

When the polyesters and a diisocyanate are brought together, especially in the presence of water, extremely rapid reaction takes place with the generation of much exothermic heat, polyester molecules are bridged together by polyurethane linkages and in many instances, carbon dioxide is generated. Under appropriate conditions, the latter can be entrapped in the mass to form foamed polyurethane resins of high cellularity valuable for use as an insulating material, as a cushioning material, as a filler for airplane propellers and for many other important purposes. The reactions involved have been discussed in the literature, for example in an article by O. Bayer et al., "Rubber Chemistry and Technology," volume 23, pages 812–835.

In the preparation of resins and foams of the foregoing type, difficulty has heretofore been experienced owing to the extreme rapidity of the reaction when the several components are brought together under reaction conditions. The reaction is so fast that the mixtures often tend to set up or resinify before adequate mixing can be attained. Local overheating and formation of blowholes and other imperfections are, therefore, frequently experienced. Experiments have been conducted in which the polyester component and the diisocyanate component have been mixed by spraying or otherwise distributing them simultaneously upon a common surface or other support. However, in such operations the sprayed material may initially be unduly fluid, but in spite of this condition, it has been found difficult to obtain adequate mixing of the polyester and the diisocyanate components upon the supporting surface before the viscosity of the mixture becomes so high that further mixing by such method cannot be obtained. Under these conditions, blow holes may still be formed in the product. The tendency to form such defects is exaggerated by the high temperatures caused by the exothermal rise attending the use of such process. Also, the use of such methods results in the volatilization of much of the diisocyanate component and this causes serious economic loss, as well as constituting a serious menace to comfort and health of the operators.

This invention is based upon the discovery that substantially anhydrous polyesters of the foregoing type can be successfully mixed with excessive amounts of diisocyanates beyond the amount required for the formation of polyurethane linkages and a single isocyanate group of each diisocyanate molecule tends to react with a hydroxyl with but little cross-linking between polyester molecules and with little or no evolution of carbon dioxide. The reaction apparently proceeds approximately as indicated by the following generalized formula:

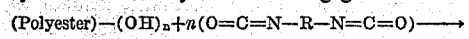
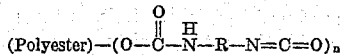

In the formula, the polyester is of comparatively high hydroxyl value and low acid number. R is hydrocarbon, straight chain, cyclic or aromatic, and does not normally exceed a chain length of 18 or 19 carbon atoms. The value of $n$ may be from 1 up so long as the polyester is liquid or fusible. Most polyesters appear to be a complex mixture involving several chain lengths. The resultant prepolymer product is comparatively stable and contains the diisocyanate in combined form. It is normally liquid in the presence of excess diisocyanate, being more so than the polyester from which it is formed.

This polyester containing an excess of diisocyanate can be mixed with catalyst under substantially anhydrous conditions and is relatively stable. When it is desired to convert it into a solid, resinous product, further polyester, preferably containing an emulsifying agent, catalyst and water is added. The mixture will now react to form a polyurethane containing urea linkages interconnecting polyurethane molecules. The reaction product is much the same as that disclosed by O. Bayer et al. in the above mentioned article.

The reaction proceeds smoothly owing to the fact that the polyester and the component containing the excess of diisocyanate are quite compatible with each other thus promoting formation of relatively uniform mixtures. Also, since a substantial amount of the total heat of reaction is liberated in the formation of the prepolymer between the portion of the polyester and the excess of diisocyanate, the ultimate temperatures attained during the final stages of reaction are substantially reduced thus preventing the excessive thermal rise which might otherwise take place. Since the diisocyanate component is chemically bound with the prepolymer, the volatilization of the diisocyanate component during the second stage of reaction, with resultant economic loss and creation of a health menace, is obviated or reduced. Furthermore, the reactions involved in forming the foam are substantially delayed, which apparently permits the mixture to attain a more thorough distribution and a state in which it can withstand the exothermal rise without collapse of the foam. These effects are so pronounced as to permit thorough mixing of the several components of a foamable composition by agitation before they are introduced into a mold or distributed upon other support.

THE POLYESTER COMPONENT

The polyester component constituting the main or basic ingredient of the material is an alkyd resin, preferably of relatively high hydroxyl value and low acid value, and is soluble and liquid or fusible. The acid components of the polyester preferably are of the dibasic type and are free of reactive unsaturation, such as ethylenic groups or acetylenic groups. Unsaturation such as occurs in the rings of such acids as phthalic, terephthalic acid, isophthalic acid or the like, is non-ethylenic and non-reactive. These acids, for purposes of the present invention, can be regarded as being saturated. They may therefore, be employed in the preparation of the polyesters herein disclosed. Other non-ethylenic dicarboxylic acids free of reactive unsaturation comprise those acids in which the carboxyl groups are interconnected by hydrocarbon groups. Suitable acids of this type include succinic acid, adipic acid, sebacic acid, azelaic acid, and others containing up to about 10 carbon atoms. Mixtures of two or more acids may be utilized. Adipic acid is usually preferred.

The dihydric alcohol components of the polyesters are represented by such alcohols as propylene glycol, dipropylene glycol, ethylene glycol, diethylene glycol, polyethylene glycol, and others. The polyhydric alcohols should contain at least 3 hydroxyls and are represented by glycerol, pentaerythritol, trimethylolethane, trimethylolpropane, mannitol and others. The polyesters containing dihydric alcohols as the sole alcoholic component tend to be more flexible and thermoplastic, but for some purposes are useful. On the other hand, those alcohols such as glycerol, pentaerythritol, and the like, containing intermediate hydroxyls react to form polyesters which in turn react with diisocyanates to form hard thermoset resins. By proper control of the ratios of the two types of alcohols, the cross-linking and therefore the hardness and thermosetting of the polyester-diisocyanate reaction products can be controlled. Accordingly, the ratio of the dihydric alcohol to the polyhydric alcohol may vary within a range of approximately 0 to 100 percent, either way, dependent upon rigidity desired. The proportions of the alcohols usually are in substantial excess of those commonly employed in the preparation of alkyd resins and may amount to 15 to 150 or 200 percent excess over stoichiometric ratios.

The esterification reactions employed in the preparation of the polyester are substantially conventional and comprise heating the mixture, with or without esterification catalyst, in well known manner to a temperature to effect evolution of water, e.g. up to about 250° F. to 450° F., or thereabouts. The reaction may be effected in the presence of a non-reactive diluent such as xylene, which will distill azeotrophically to assist in carrying away the water of reaction. The reaction is preferably continued until the product is viscous, but liquid, or at least becomes liquid when it is heated. The acid value usually is reduced, often as low as practicable, for example, below 20 and preferably below about 12. Products of an acid value of 1 or below are obtainable and may be advantageously employed in the preparation of foams. The ratios, hydroxyls/carboxyls are correspondingly high, for example, in a range of 50 up to 500 or 600. Water of reaction is stripped from the polyester employed in preparing the prepolymer, usually to such degree as to provide a substantially anhydrous product or one which is as nearly anhydrous as is practical to obtain. Probably, in most instances, the residual water content of the polyester will not exceed about 0.1 or 0.5 percent and may be substantially zero.

THE DIISOCYANATE COMPONENT

The polyester may be mixed with a wide variety of diisocyanates in such amounts as to provide a substantial excess of diisocyanate molecules as compared with the available hydroxyls. Diisocyanates which may be interacted with polyesters in accordance with the provisions of the present invention contain the group $$O=C=N-R-N=C=O$$

where R is aromatic, heterocyclic, aliphatic or a mixed group comprising moieties from two or more of these classes. Preferably, it contains from about 2 to 19 carbon atoms. The hydrocarbon group may also contain chroline or other substantially non-reactive groups. The following constitutes an illustrative group of diisocyanates which may be employed in the practice of the invention:

Diphenyl diisocyante
Triphenyl diisocyanate
Chlorophenyl-2,4-diisocyanate
Ethylene diisocyanate
1,4-tetramethylene diisocyanate
p-Phenylene diisocyanate
Tolylene diisocyanate (preferably as a mixture of isomers)
p,p'-Diisocyanate diphenylmethane
Hexamethylene diisocyanate, and others The tolylene diisocyanate mixed isomers, because of general availability and satisfactory operation in the process, are presently preferred, though of course, as commercial conditions change this preference is also subject to change.

In preparing a prepolymer of a polyester and a diisocyanate in accordance with the provisions of the present invention, it is preferable that the polyester and the diisocyanate be so proportioned that approximately 50 percent thereof, e.g. 30 percent to 60 percent, of the total polyester is embodied in the prepolymer component. It is necessary that the total of the diisocyanate component be embodied in the prepolymer fraction. The diisocyanate component of the prepolymer will vary in amount dependent upon the available hydroxyls in the polyester. Usually the diisocyanate will be employed in a ratio to provide about 1 to 5 moles of diisocyanate per equivalent of combined hydroxyls and carboxyls in the polyester of the prepolymer component. For a flexible foam a range of 25 to 150 grams of diisocyanate per 100 grams of polyester in the prepolymer is satisfactory where the diisocyanate is tolylene diisocyanate mixed isomers. The resultant prepolymer is a liquid, sprayable material containing about one mole of diisocyanate per hydroxyl group and therefore, contains many isocyanate groups available for further reaction when more polyester is added.

In the production of rigid foams, even higher proportions of diisocyanate are employed. The range of tolylene diisocyanate may extend up to or near 900 or 1000 grams per 100 grams of the polyester.

In one method which is preferred for some uses, the diisocyanate component is initially mixed with the polyester component and an emulsifying agent such as one of those herein disclosed. A catalyst, which may be the same as is subequently described, is also added and the mixture of prepolymer components then reacts. The heat evolved, though considerable, is less than when the polyester and the diisocyanate are mixed in conventional manner in approximately stoichiometric ratios with respect to each other.

THE CATALYSTS

In order to obtain fully cured resin products which are interpolymers of the polyester and a diisocyanate, it is preferable to incorporate into one or both components (prepolymer and polyester), a suitable catalyst of reaction. The catalyst may be the same or similar to that employed in preparing the prepolymer. Such catalysts include: N-methyl morpholine, above referred to; and tertiary amines, such as trimethyl amine and triethyl amine, as well as others of the general type.

If a delay in the action of the catalyst is desired, a quaternary ammonium compound, which under reaction conditions will decompose to liberate a tertiary amine in situ, may be employed. A number of such compounds are disclosed in an application to Earl E. Parker et al. hereinafter designated and made a part hereof. Examples of such materials as disclosed in the copending application comprise the chloride salts of Mannich bases. One such salt is of the formula:

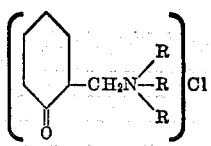

where R is methyl, benzyl or the like.

The catalyst is employed in an amount of approximately 0.25 to 10 percent based by weight upon the polyester. Preferably, it is divided between the polyester component and the prepolymer component, though the invention includes the incorporation of the entire amount in a single component, if so desired.

THE WATER COMPONENT

Water is usually added to the interpolymerizable mixture in order to promote the formation of urea bridges between polyester molecules, which reaction is also accompanied by the evolution of carbon dioxide which is necessary in the preparation of sponges or foams. The water is usually added in an amount of about 0.25 to 10 percent by weight based upon the total of the polyester component.

The water may be employed as free water, or it may be added in latent or bound state as for instance as a hydrated salt such as hydrated magnesium sulfate ($MgSO_4 \cdot 7H_2O$), the trihydrate of sodium acetate, or as the heptahydrate, or the decahydrate of sodium sulfate (Glauber's salt). If hydrated salts are added, the amount thereof is based upon the stoichiometric equivalency of the water content.

The water is usually incorporated in substantially its entirety into the polyester component and may readily be mixed with the latter by agitation or stirring. So long as the mixture is not contacted with isocyanate groups such as occur in the interpolymer, it has but little effect.

THE EMULSIFIER

The emulsification of the diisocyanate with the polyester in forming the prepolymer and likewise the emulsification of the polyester with water as a preliminary to the preparation of the ultimate interpolymerizable mixture, may be promoted by the addition of a suitable emulsifying agent which may be one of the conventional types of emulsifiers which are often sold commercially. Appropriate emulsifiers comprise Triton–X–100, which is a condensate of an alkyl phenol and ethylene oxide; Tween–40, which is a polyoxyethylene sorbitan monopalmitate-ethylene oxide reaction product; Tween–60, which is a sorbitan monostearate-ethylene oxide reaction product; Arquad 2–C, which is a quaternary ammonium salt of the probable formula,

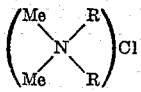

Emcol–H–77, sold by the Emulsol Corporation and a mixture of an anionic and non-ionic emulsifier, one being a polyol-carboxylic acid blend and the other being a sulfonated fatty acid. The blend is a liquid material. The emulsifier may be employed in a range of 1 to 10 percent based upon the polyester component and may be incorporated in one or both of the components of the resinifiable mixture.

The preparation of polyesters suitable for reaction with diisocyanates for use in the practice of the present invention is illustrated by the following examples:

Example A

This polyester was prepared from a mixture comprising:

| | |
|---|---|
| Adipic acid | 16 moles. |
| Diethylene glycol | 18 moles. |
| Glycerine | 1 mole. |
| Catalyst (para-toluene-sulfonic acid) | 0.1 percent based upon the mixture. |

This mixture was reacted in accordance with conventional procedures to form a liquid resin having a hydroxyl value in a range of 60 to 80 and an acid number of 12 or less. The polyester is liquid in form. This polyester is of rather low hydroxyl value and is often employed in forming more flexible foams. The glycerine of this polyester may be replaced in total or in part by trimethylol propane. Similarly, the diethylene glycol may be replaced by hexanediol.

Types of resins well adapted for the preparation of more rigid foams are represented by the following:

Example B

The resinifiable mixture comprised:

| | Moles |
|---|---|
| Phthalic anhydride | 2 |
| Adipic acid | 10 |
| Trimethylol propane | 20 |

The mixture preferably is cooked to an acid value of about 1 and a hydroxyl value of about 450. The resin is liquid and the high hydroxyl value renders it especially useful in forming rigid foams.

Example C

The resinifiable mixture comprised:

| | Moles |
|---|---|
| Phthalic anhydride | 1 |
| Adipic acid | 5 |
| Glycerol | 8 |

The mixture preferably is cooked to an acid number of about 10. The polyester is of high hydroxyl value and is a liquid product well adapted for mixing with diisocyanates, emulsifying agents and delayed action catalysts as herein disclosed. The resin foams when this polyester is reacted with diisocyanates are of the rigid type.

Example D

A polyester was prepared comprising:

| | Moles |
|---|---|
| Glycerol | 7.6 |
| Adipic acid | 5.0 |
| Phthalic anhydride | 1.0 |

The mixture was cooked to an acid value of 42–46, a hydroxyl number of 400 to 500 and a viscosity of 45,000 cps. to 100,000 cps. It could be mixed with diisocyanates such as a mixture of toluene diisocyanates, emulsifying agent, hydrated salt such as the decahydrate or heptahydrate of sodium sulfate, and foamed.

Example E

A further liquid polyester comprising a fatty acid was prepared. The polyester contained:

| | Moles |
|---|---|
| Adipic acid | 4 |
| Phthalic anhyride | 1 |
| Oleic acid | 2 |
| Glycerol | 8 |

Foamable mixtures of the polyester may contain quaternary ammonium compounds as the catalyst as herein disclosed.

Example F

In this example, the polyhydric alcohol component comprised a mixture of diethylene glycol and pentaerythritol. The proportions of the components of the polyester were as follows:

| | Moles |
|---|---|
| Adipic acid | 5 |
| Phthalic anhydride | 1 |
| Diethylene glycol | 4 |
| Pentaerythritol | 3.6 |

The polyester when cooked, forms a polyester suitable for use in the several foamable compositions hereinafter described.

Example G

The polyester of this example embodies a mixture of phthalic anhydride and adipic acid as the dibasic acid component. The polyhydric alcohol component comprises trimethylol propane. The proportions of the several ingredients are as follows:

| | Moles |
|---|---|
| Phthalic anhydride | 1 |
| Adipic acid | 5 |
| Trimethylol propane | 9.2 |

The product was cooked to a hydroxyl value of 473 and an acid value of approximately 1. This polyester is very well adapted for use in forming rigid foams.

Any of the foregoing polyesters may be mixed with large amounts of a diisocyanate, such as tolylene mixed diisocyanate, to form prepolymers containing available monoisocyanate groups. For purposes of obtaining ready dispersion of the polyester and the diisocyanate, an emulsifying agent may be included; a catalyst such as one of those already described may also be added, if desired, in which case, the reaction mixture tends to beat up exothermically, but reaction may be promoted, especially during the early stages, by external heating in which case a catalyst is not required. After the reaction between the polyesters and the diisocyanates is completed, the mixtures may be cooled. The prepolymer product is a liquid which is spreadable by spraying or other method. The viscosity can be adjusted, if desired, by adding polyester to increase the viscosity, or if lower viscosity is desired, additional diisocyanates may be added.

Prepolymers prepared from polyesters and diisocyanates in which the diisocyanate is in relatively low ratio and in the presence of N-methyl morpholine or other catalyst tend gradually to thicken if allowed to stand before they are incorporated with the second (B) component and foamed. Surprisingly, it has been found that much more stable prepolymers that can be stored for long periods without gelation can be obtained by adding excess of diisocyanate to the polyester and reacting them in the absence of catalyst by application of heat. For example, a polyester, such as hereinafter described, can be mixed with p-tolylene diisocyanate in amounts in the ranges previously described and reacted by heating the mixture to about 60° C. for about 1 hour. The resultant prepolymer, in the absence of water can be stored for weeks without undue thickening.

The prepolymer mixture constituting component A is incorporated with component B comprising added polyester which preferably includes water (free or latent) and an emulsifying agent and catalyst in proper amounts.

Generalized formulae of compositions A and B which are mixed to form the final product are approximately as follows:

COMPOSITION A

| | Parts by weight |
|---|---|
| Polyester (from any of Examples A through F) | 100 |
| Diisocyanate | 20 to 1,000 |
| Catalyst | 0 to 5 |
| Emulsifier | 0 to 12 |

This constitutes the mixture before prepolymer formation.

COMPOSITION B

| | Parts by weight |
|---|---|
| Polyester (from any of Examples A through F) | 50 to 200 |
| Water (free or latent) | 0.0 to 10 |
| Catalyst | 0.0 to 10 |
| Emulsifier | 1.0 to 10 |

The incorporation of the polyester and water component (resin B) with the prepolymer (resin A) takes place very readily and can be accomplished, for example, by agitating the two components together or in many instances, by spraying the two components simultaneously upon a support, such as a panel, or a suitable mold. The polyester and the prepolymer mix adequately without further agitation and will react to form a foam in situ without application of external heat; but, if desired, the mixture may be heated, for example to any reasonable temperature up to about 300° F. since the prepolymer has already given up a portion of its heat of reaction in the course of formation, the temperature of the foam is substantially less than that which is obtained by incorporating all of the diisocyanate with all of the polyester and effecting reaction to form a polyurethane resin in a single operation. This reduction of the temperature, thus obtainable, is beneficial inasmuch as it reduces the tendency to form oversized bubbles and it is beneficial in other respects. Baking usually is completed within about 20 to 120 minutes at 180° F. to 250° F.

The mixing of the prepolymer component and the polyester component by spraying has been referred to as being suitable for the preparation of more flexible foams; however, it is apparent that other methods of mixing two components may be employed and often are preferred. This is especially true for rigid foams. For example, they may be merely stirred together in an appropriate container and then allowed to polymerize and foam to provide suitable slabs or cakes of cellulated material. The two components (prepolymer and polyester) may also be fed into a suitable mixer, such as a turbo mixer, driven at relatively high speed in order to effect quick emulsification of all of the ingredients. The mixture from the turbo mixer may be drawn off and applied by suitable spreading apparatus to a continuously traveling surface or they may be fed into a mold or other device. The mixture then foams and gels even at room temperature and can ultimately be cured at room temperature or by an appropriate baking operation in well known manner.

The following examples illustrate the preparation of foamed polyester resins in accordance with the provisions of this invention.

Example I

A polyester was prepared as in Example A. This polyester was of a hydroxyl value of 60 to 80 and was of an acid value of about 2. A prepolymer was prepared from a mixture comprising an anhydrous or nearly anhydrous polyester as described in Example A. The tolylene diisocyanate comprised mixed isomers sold commercially as Desmodur-T.

The prepolymer (component A) comprised:

| | Parts by weight |
|---|---|
| Polyester (Example A) | 100 |
| Tolylene diisocyanates (Desmodur-T) | 150 |
| N-methyl morpholine | 2 |
| Emcol-H-77 | 2 |

If desired, the catalyst (N-methyl morpholine) could be omitted from this mixture and reaction may then be attained by heating the same to about 60° C. The resultant mixture will stand for long periods without appreciable thickening. Such stable prepolymer when mixed with an emulsion of added polyester, water, emulsifier and catalyst, will react to provide a solid foamed resin product. The catalyzed mixture starts to react at room temperature with the evolution of heat to form the prepolymer. At the completion of the reaction, the mixture may be allowed to cool to room temperature and this mixture constitutes component A of the interpolymerizable mixture. As component B, a composition was prepared comprising:

| | Parts by weight |
|---|---|
| Polyester (as above described) | 100 |
| N-methyl morpholine | 5 |
| Emcol-H-77 | 2 |
| Water | 1-2 |

Both components are liquid, sprayable materials and may be applied to a panel by spraying through a sprayer having two outlet orifices using compressed air, carbon dioxide, or the like in order to effect breaking up of the liquids into fine droplets. The droplets of the two components upon striking a panel or other support, coalesce and blend to provide a mixture which foams and gels within a period of 1 hour. The mixture may be cured to a solid, resinous material of relatively flexible state by curing at room temperature or baking for 1 hour at 220° F.

It is to be understood that in this example the N-methyl morpholine may be replaced by other catalysts, such as the tertiary amines referred to hereinabove. The Emcol-H-77 may be replaced by other emulsifiers, such as Triton-X-100 or Tween-40.

*Example II*

In accordance with this example, a foamed resin was prepared in which the prepolymer component was formed by heating in the absence of catalyst, a mixture of polyester and a diisocyanate. The prepolymer components were as follows:

| | Parts by weight |
|---|---|
| Polyester (which was substantially the same as that of Example A) | 100 |
| Tolylene diisocyanate | 30 |

The mixture was substantially anhydrous and no catalyst was employed. The temperature of reaction reached 95° C. and was maintained until a viscosity of 20,000 centipoises was obtained. Usually a time interval of 30 to 45 minutes has been found sufficient to obtain the desired viscosity. The foregoing reaction can be effected in the presence of a solvent, for example, a ketonic solvent such as acetone. An appropriate proportion of acetone in the reaction is approximately 5 parts by weight. If desired, acetone may be replaced by a similar amount of tricresyl phosphate.

This prepolymer can be mixed with a composition comprising emulsifying agent, water and catalyst. The following is illustrative of such composition:

| | Parts by weight |
|---|---|
| Prepolymer | 125 |
| Emulsifier (Emcol-H-77) | 2 |
| Water | 2 |
| Catalyst (N-methyl morpholine) | 1 |

The mixture can be cured in a period of approximately 30 minutes at 220° F. to a resinous product of a density of 9 to 11 pounds per cubic foot.

*Example III*

In accordance with this example, a prepolymer was prepared which comprises polyester (as in Example A) 100 parts by weight, tolylene diisocyanate 50 parts by weight. This mixture was reacted at 95° C. until a viscosity of 14,000 centipoises was obtained. This occurred within a period of about 30 to 45 minutes.

In order to provide a foamable composition, 150 parts of the foregoing prepolymer in substantially anhydrous state and preferably at about room temperature was mixed with an emulsion of the following composition:

| | Parts by weight |
|---|---|
| Polyester (from Example A) | 100 |
| Emulsifier (Emcol-H-77) | 4 |
| Water | 2 |
| Catalyst (N-methyl morpholine) | 2 |

These components were mixed by agitation whereupon they foamed and were cured at a temperature of about 220° F. for approximately 30 minutes. The resultant solid resin product was a relatively flexible foam of a density of about 6 to 9 pounds per cubic foot.

*Example IV*

In accordance with the provisions of this example, a foamable mixture was prepared in which the hydrating agent was a paste of a mixture of 35 per cent by weight of the trihydrate of sodium acetate in a polyester which was the same as that of Example A. The prepolymer contained 50 parts of tolylene diisocyanate mixed isomers and 100 parts of polyester which was the same as that of Example A.

The catalyst was a quaternary ammonium compound such as is disclosed in a copending application to Earl E. Parker et al., entitled "Quaternary Ammonium Compounds as Catalysts in Preparing Polyurethane Resins," Serial Number 526,311, filed August 3, 1955.

In the present example, the quaternary ammonium compound was the salt of N-methyl morpholine and acetic anhydride. To 150 parts by weight of the prepolymer was added an emulsion comprising:

| | Parts by weight |
|---|---|
| Sodium acetate resin paste (as described) | 28.6 |
| Polyester (as per Example A) | 81.4 |
| Catalyst (quaternary ammonium of N-methyl morpholine and acetic anhydride) | 3.0 |
| Emulsifier (Emcol-H-77) | 4.0 |

The foregoing mixture foamed and cured to a good cellular structure having a density of 8 to 11 pounds per cubic foot.

*Example V*

This example illustrates the preparation of a rigid foam which is valuable as a thermal insulator, as a sound deadener, or as a filling for hollow structures such as airplane propellers, and for many other purposes. The polyester, in this example, was the same as that of Example C. One hundred twenty-nine parts by weight of this polyester was mixed over a period of 2 or 3 hours with 522 parts by weight of tolylene diisocyanate (mixed isomers), during which time the temperature was allowed to rise to 35° C. At the conclusion of this interval, the mixture had become relatively compatible. It was held for another hour at 65° C. to 95° C., or until a viscosity of approximately $Z_3$ had been attained. The prepolymer in an amount of 187 parts by weight was mixed with an emulsion of:

| | Parts by weight |
|---|---|
| Polyester | 163 |
| Emulsifier (Tween-40) | 2.0 |
| Catalyst (dimethylethanol amine) | 0.5 |
| Water | 4 |

The mixture foamed and when cured, was of a density of 4.0 pounds per cubic foot. The structure was relatively rigid.

For purposes of determining the effect of changes of proportions of water in the mixture upon the density of the foam product, a series of samples identical with the foregoing foamable composition except for the variation of the amount of water, was prepared. The variations of density of the foamed product in pounds per cubic feet for given amounts of water are tabulated as follows:

Water (parts by weight): Pounds per cubic feet
```
8 ----------------------------------------- 1.83
6 ----------------------------------------- 2.6
4 ----------------------------------------- 4
2 ----------------------------------------- 6.8
1 ----------------------------------------- 10
0 ----------------------------------------- 24
```

The fact that the sample containing no water was foamed to a certain extent was probably in large measure due to reaction of the isocyanate with free carboxyl groups in the added resin, also, reaction with residual water contained in the added polyester component.

*Example VI*

In this example, the polyester substantially corresponds to that disclosed in Example G preceding. A prepolymer was prepared comprising:

```
                                    Parts by weight
Polyester ----------------------------------- 129
Tolylene diisocyanate ----------------------- 522
```

The mixture was stirred and the temperature was allowed to rise to about 35° C. and was held in this range until the prepolymer was finished. A foamable composition was prepared comprising 200 parts by weight of the foregoing prepolymer and an emulsion of the composition:

```
                                    Parts by weight
Polyester (as per Example G) ---------------- 160
Emulsifier (Tween-40) ----------------------- 2
Catalyst (dimethylethanol amine) ------------ 0.5
Water --------------------------------------- 4
```

The emulsion and the prepolymer were mixed together at approximately atmospheric temperature, were allowed to foam and were then cured to provide a rigid structure of a density of 3.3 pounds per cubic foot. This product was of very low weight and well adapted for use as thermal insulation, as sound insulation, as a filler for hollow structures such as airplane parts, and many other important uses.

A series of samples of progressively decreasing water content, based upon the foregoing composition were prepared and cured. The water content and the corresopnding density of the samples are tabulated as follows:

```
                              Density (pounds
Water content (parts by weight)  per cubic feet)
8 ----------------------------------------- 1.8
6 ----------------------------------------- 2.1
4 ----------------------------------------- 3.3
2 ----------------------------------------- 5.5
1 ----------------------------------------- 8.4
0.5 --------------------------------------- 13.4
0.2 --------------------------------------- 17.4
0 ----------------------------------------- 30.6
```

The foaming in the absence of added water was probably due, at least in part to the reaction of the isocyanate groups with unreacted carboxyl groups in the added resin and to the reaction of said isocyanate groups with residual water remaining in the added polyester.

The adjustment of the water content of the foamable composition provides a convenient method of tailoring the density of the foam composition substantially to any desired value.

*Example VII*

In this example, a polyester of the composition disclosed in Example A and of an acid value below 5 was employed in a series of prepolymer mixtures as A components and these were then paired with mixtures of the same polyester, water and emulsifier as B components. The two components were mixed together by stirring and allowed to foam and set. The compositions of the A components and the corresponding B components were as follows:

|   |   | Component A, Grams | Component B, Grams |
|---|---|---|---|
| 1 | Polyester | 25 | 75 |
|   | Tolylene diisocyanate mixed isomers | 25 |   |
|   | N-methyl morpholine | 2 |   |
|   | Water |   | 2.3 |
|   | Emulsifier (Emcol-H-77) |   | 2.3 |
| 2 | Polyester | 40 | 60 |
|   | Tolylene diisocyanate mixed isomers | 25 |   |
|   | N-methyl morpholine | 2 |   |
|   | Water |   | 2.3 |
|   | Emulsifier (Emcol-H-77) |   | 2.3 |
| 3 | Polyester | 50 | 50 |
|   | Tolylene diisocyanate mixed isomers | 25 |   |
|   | N-methyl morpholine | 2 |   |
|   | Water |   | 2.3 |
|   | Emulsifier (Emcol-H-77) |   | 2.3 |
| 4 | Polyester | 20 | 80 |
|   | Tolylene diisocyanate mixed isomers | 25 |   |
|   | N-methyl morpholine | 2 |   |
|   | Water |   | 2.3 |
|   | Emulsifier (Emcol-H-77) |   | 2.3 |

In the several examples (I through VII), the polyester component is the same for both components A and B. It will be appreciated that it is entirely within the purview of the invention in the foregoing examples, to use different esters in the two components; thus, in each of the Examples, II through VI, the prepolymer may be formed from the polyester of Example A, whereas the B component is the polyester specified in any one of the Examples B through G. Conversely, the polyesters, component A specified in the Examples II through VI may be the polyester of the corresponding example, whereas component B comprises polyester A.

In a copending application to Earl E. Parker et al., Serial Number 484,022, filed January 25, 1955, is disclosed a valuable sponge structure comprising an interpolymer of a polyester and dissocyanate in which the cells are of mixed sizes some of them being relatively large and being uniformly distributed in masses of small cells. It is to be understood that the techniques of the present invention involving the formation of a prepolymer of a portion of the polyester and the total of the diisocyanate and the subsequent incorporation of the remainder of the polyester together with water may be applied in forming the sponges as disclosed in the aforementioned application. The use of such techniques is illustrated by the following example.

*Example VIII*

In this example, the polyester component is the same as disclosed in Example A. In accordance with the example, 38 grams of this polyester are mixed with 2 grams of a quaternary ammonium compound which is the salt of N-methyl morpholine and acetic anhydride, 1 gram of wetting agent, namely, Emcol-H-77 and 25 grams of mixed isomers of tolylene diisocyanate. The prepolymer thus formed is then mixed with 38 grams of the foregoing polyester, 30 grams of hydration paste comprising 20 percent of sodium acetate trihydrate in the above polyester, 1 gram of Emcol-H-77 and 3 grams of N-methyl morpholine-acetic anhydride reaction product. The mixture after foaming, is allowed to stand for 1 hour and then is baked for 1 additional hour at 220° F. whereby to provide a useful foamed resin.

It will be apparent to those skilled in the art that the embodiments of the invention herein disclosed are by way of example or illustration and that numerous modifications may be made therein without departure from the spirit of the invention or the scope of the appended claims.

We claim:

1. A method of forming a foamed polyurethane resin which comprises mixing and foaming two components, (A) and (B), component (A) being an emulsion of (1) a polyester which is the esterification product of a dicarboxylic acid and a mixture of a pair of alcohols, one alcohol being dihydric and being selected from the group consisting of ethylene glycol, propylene glycol, dipropylene glycol, and polyethylene glycol, and the second alcohol being polyhydric and being selected from the group consisting of glycerol, pentaerythritol, trimethylolethane, trimethylolpropane, and mannitol, said polyester being of a hydroxyl value in the range of about 50 to about 600, and an acid number in the range of about 1 to about 20, (2) about 0.23 to 10 percent of water, (3) about 1 to 10 percent of an emulsifying agent, and (4) about 0.2 to 10 percent of a tertiary amine, the foregoing percentages being based upon the polyester; component (B) being a reaction product of a polyester of a dicarboxylic acid and a mixture comprising a pair of alcohols, one alcohol being dihydric and being selected from the group consisting of ethylene glycol, propylene glycol, dipropylene glycol, and polyethylene glycol, and the other alcohol of the mixture being a polyhydric alcohol and being selected from the group consisting of glycerol, pentaerythritol, trimethylolethane, trimethylolpropane, and mannitol, the latter-mentioned of said polyesters being of a hydroxyl value in the range of about 50 to about 600, and an acid number in the range of about 1 to 20, the reaction product containing about 25 to about 1000 parts by weight per 100 parts by weight of polyester of an organic diisocyanate, the ratio in parts by weight of the polyester in said reaction product in component (B) to the polyester in component (A) being within a range between about 4:1 and about 1:2.

2. The method as defined in claim 1 in which the organic diisocyanate is toluene diisocyanate.

3. A method of forming a foamed polyurethane resin which comprises mixing and foaming two components, (A) and (B), component (A) being an emulsion of (1) a polyester which is the esterification product of a dicarboxylic acid selected from the group consisting of phthalic acid and an aliphatic dicarboxylic acid, and a mixture comprising a pair of alcohols, one alcohol of said pair being dihydric and being selected from the group consisting of ethylene glycol, propylene glycol, dipropylene glycol, and polyethylene glycol, and the second alcohol of the pair being selected from the group consisting of glycerol, pentaerythritol, trimethylolethane, trimethylolpropane, and mannitol, said polyester being of a hydroxyl value in the range of about 50 to about 600, and an acid number in the range of about 1 to about 20, (2) about 0.23 to 10 percent of water, (3) about 1 to 10 percent of an emulsifying agent, and (4) about 0.2 to 10 percent of a tertiary amine, the foregoing percentages being based upon the polyester; component (B) being a reaction product of a polyester which is also an esterification product of a dicarboxylic acid selected from the group consisting of phthalic acid and an aliphatic dicarboxylic acid, and a mixture of a pair of alcohols, one alcohol of the pair being dihydric and being selected from the group consisting of ethylene glycol, propylene glycol, dipropylene glycol, and polyethylene glycol, and the other alcohol being a polyhydric alcohol selected from the group consisting of glycerol, pentaerythritol, trimethylolethane, trimethylolpropane, and mannitol, the latter-mentioned of said polyesters being of a hydroxyl value in the range of about 50 to about 600, and an acid number in the range of about 1 to 20, the reaction product containing about 25 to about 1000 parts by weight per 100 parts by weight of polyester of an organic diisocyanate, the ratio in parts by weight of the polyester in said reaction product in component (B) to the polyester in component (A) being within a range between about 4:1 and 1:2.

4. A method of forming a foamed polyurethane resin which comprises mixing by stirring and then foaming two components, (A) and (B), component (A) being an emulsion of (1) a polyester which is the esterification product of a dicarboxylic acid and a mixture of a pair of alcohols, one alcohol being dihydric and being selected from the group consisting of ethylene glycol, propylene glycol, dipropylene glycol, and polyethylene glycol, and the second alcohol being polyhydric and being selected from the group consisting of glycerol, pentaerythritol, trimethylolethane, trimethylolpropane, and mannitol, said polyester being of a hydroxyl value in the range of about 50 to about 600, and an acid number in the range of about 1 to about 20, (2) about 0.23 to 10 percent of water, (3) about 1 to 10 percent of an emulsifying agent, and (4) about 0.2 to 10 percent of a tertiary amine, the foregoing percentages being based upon the polyester; component (B) being a reaction product of a polyester of a dicarboxylic acid and a mixture comprising a pair of alcohols, one alcohol being dihydric and being selected from the group consisting of ethylene glycol, propylene glycol, dipropylene glycol, and polyethylene glycol, and the other alcohol of the mixture being a polyhydric alcohol and being selected from the group consisting of glycerol, pentaerythritol, trimethylolethane, trimethylolpropane, and mannitol, the latter-mentioned of said polyesters being of a hydroxyl value in the range of about 50 to about 600, and an acid number in the range of about 1 to 20, the reaction product containing about 25 to about 1000 parts by weight per 100 parts by weight of polyester of an organic diisocyanate, the ratio in parts by weight of the polyester in said reaction product in component (B) to the polyester in component (A) being within a range between about 4:1 and about 1:2.

References Cited in the file of this patent

UNITED STATES PATENTS

| 2,602,783 | Simon et al. | July 8, 1952 |
| 2,625,535 | Mastin et al. | Jan. 13, 1953 |
| 2,650,212 | Windemuth | Aug. 25, 1953 |
| 2,729,618 | Muller et al. | Jan. 3, 1956 |
| 2,753,319 | Brockway | July 3, 1956 |
| 2,779,689 | Reis | Jan. 29, 1957 |
| 2,827,665 | Rogers et al. | Mar. 25, 1958 |
| 2,871,227 | Walter | Jan. 27, 1959 |

OTHER REFERENCES

Rubber World, August 1954, page 671, Abstract No. 37.

UNITED STATES PATENT OFFICE
CERTIFICATE OF CORRECTION

Patent No. 2,981,700                                April 25, 1961

Earl E. Parker et al.

It is hereby certified that error appears in the above numbered patent requiring correction and that the said Letters Patent should read as corrected below.

Column 3, line 74, for "chroline" read -- chlorine --; column 4, line 4, for "Diphenyl diisocyante" read -- Diphenyl diisocyanate --; column 7, line 37, for "beat" read -- heat --; column 11, line 46, for "corresopnding" read -- corresponding --; column 12, line 38, for "dissocyanate" read -- diisocyanate --.

Signed and sealed this 8th day of May 1962.

(SEAL)
Attest:

ERNEST W. SWIDER                              DAVID L. LADD
Attesting Officer                                 Commissioner of Patents